(12) United States Patent
Schirmer et al.

(10) Patent No.: US 9,076,334 B2
(45) Date of Patent: Jul. 7, 2015

(54) NAVIGATION SYSTEM AND NAVIGATION METHOD

(75) Inventors: Hartmut Schirmer, Pinneberg (DE); Karl-Friedrich Rauterberg, Schellerten (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 12/987,488

(22) Filed: Jan. 10, 2011

(65) Prior Publication Data
US 2011/0106430 A1    May 5, 2011

Related U.S. Application Data

(62) Division of application No. 11/018,484, filed on Dec. 17, 2004, now Pat. No. 7,869,947.

(30) Foreign Application Priority Data

Dec. 19, 2003 (EP) .................................. 03029495

(51) Int. Cl.
| | | |
|---|---|---|
| G01C 21/00 | (2006.01) | |
| G08G 1/123 | (2006.01) | |
| G08G 1/0968 | (2006.01) | |
| G01C 21/36 | (2006.01) | |
| G01C 21/34 | (2006.01) | |

(52) U.S. Cl.
CPC ...... *G08G 1/096811* (2013.01); *G01C 21/3415* (2013.01); *G01C 21/3492* (2013.01); *G01C 21/3626* (2013.01); *G08G 1/096827* (2013.01); *G08G 1/096872* (2013.01)

(58) Field of Classification Search
CPC ............... G08G 1/096827; G08G 1/096872; G08G 1/096811; G08G 1/096844; G01C 21/3415; G01C 21/26; G01C 21/3492
USPC ............. 701/1, 200, 207–215, 300–302, 400, 701/411, 417, 423, 437; 340/988, 340/995.1–995.27
See application file for complete search history.

(56) References Cited

U.S. PATENT DOCUMENTS

| | | | |
|---|---|---|---|
| 5,043,902 A * | 8/1991 | Yokoyama et al. | 701/211 |
| 5,122,961 A * | 6/1992 | Toyama et al. | 701/208 |
| 5,177,685 A | 1/1993 | Davis et al. | |

(Continued)

FOREIGN PATENT DOCUMENTS

| | | |
|---|---|---|
| JP | 8166762 A | 6/1996 |
| JP | 09304083 | 11/1997 |

(Continued)

*Primary Examiner* — Jack W Keith
*Assistant Examiner* — Chuong P Nguyen
(74) *Attorney, Agent, or Firm* — NSIP Law

(57) ABSTRACT

A navigation system and method having a function of alerting the driver to potential wrong way driving comprises means 102 for determining a position of a vehicle 300, means 107 for calculating a driving route of the vehicle 300, means 108 for determining a driving maneuver in accordance with the predetermined driving route 305, means 104, 105, 110, 111 for outputting indications relating to the determined driving maneuver to a driver of the vehicle 300, and means 109 for alerting the driver to potential wrong way driving including means 201 for detecting a potential wrong way driving situation and means 202, 104, 105, 110, 111 for outputting an indication relating to the potential wrong way driving situation to the driver.

20 Claims, 4 Drawing Sheets

(56) References Cited

U.S. PATENT DOCUMENTS

| | | | |
|---|---|---|---|
| 5,343,399 | A | 8/1994 | Yokoyama et al. |
| 5,358,529 | A | 10/1994 | Snider |
| 5,359,529 | A * | 10/1994 | Snider .................... 701/210 |
| 5,369,588 | A | 11/1994 | Hayami et al. |
| 5,508,931 | A | 4/1996 | Snider |
| 5,874,905 | A | 2/1999 | Nanba et al. |
| 5,904,728 | A | 5/1999 | Tamai et al. |
| 6,018,697 | A * | 1/2000 | Morimoto et al. ........ 701/411 |
| 6,199,013 | B1 | 3/2001 | O'Shea |
| 6,388,582 | B2 | 5/2002 | Yamashita et al. |
| 6,397,145 | B1 * | 5/2002 | Millington ................ 701/432 |
| 6,405,131 | B1 * | 6/2002 | Barton ..................... 701/211 |
| 6,466,868 | B2 | 10/2002 | Sakashita |
| 7,127,350 | B2 | 10/2006 | Oikubo |
| 7,219,012 | B2 * | 5/2007 | Yoshikawa et al. ....... 701/423 |
| 7,502,685 | B2 * | 3/2009 | Nakamura ................ 701/437 |
| 2002/0032523 | A1 | 3/2002 | Sakashita |
| 2002/0188400 | A1 * | 12/2002 | Sato et al. ................ 701/212 |
| 2002/0194016 | A1 * | 12/2002 | Moribe et al. ................ 705/1 |
| 2003/0229444 | A1 * | 12/2003 | Bullock et al. ............ 701/202 |
| 2003/0233408 | A1 | 12/2003 | Goodman |
| 2004/0124971 | A1 * | 7/2004 | MacTavish et al. ...... 340/425.5 |
| 2007/0106459 | A1 * | 5/2007 | Nakayama et al. ........ 701/201 |

FOREIGN PATENT DOCUMENTS

| | | |
|---|---|---|
| JP | 10002751 | 1/1998 |
| JP | 2000055681 | 2/2000 |

* cited by examiner

NAVIGATION SYSTEM AND NAVIGATION METHOD

CROSS-REFERENCE TO RELATED APPLICATIONS

This application is a divisional of U.S. patent application Ser. No. 11/018,484, filed Dec. 17, 2004 now U.S. Pat. No. 7,869,947, titled NAVIGATION SYSTEM AND NAVIGATION METHOD, which claims priority to European Application Serial No. 03 029 495.3, filed Dec. 19, 2003, titled NAVIGATION SYSTEM AND NAVIGATION METHOD, of which both applications are incorporated by reference in this application in their entirety.

TECHNICAL FIELD

The invention relates to a navigation system and method approaches and more particularly to navigation system and method approaches for predetermining a driving route.

BACKGROUND

Navigation systems have become known in the art as computer-based systems that are mounted in a vehicle for calculating a driving route to a final destination input by the driver and outputting driving indications for guiding the driver to the desired destination. The driving indications include announcements and instructions relating to forthcoming driving maneuvers, which have to be performed by the driver in order to follow the calculated driving route. The driving maneuvers are determined by the navigation system based upon the calculated driving route (i.e. crossings, junctions and the like) and output to the driver, typically by an audio-response unit for voice output of the navigation system.

More specifically, once a driving route to a final destination has been calculated, the navigation system determines the driving maneuvers that have to be performed by the driver at different points (locations) along the route while following the calculated driving route from the starting point to the final destination.

Subsequently, when the vehicle, which is traveling along the calculated driving route, approaches the point of the route where a driving maneuver should be performed, different driving indications relating to the forthcoming driving maneuver are output sequentially to the driver based upon the distance to the respective point of the route.

As to the content of such driving indications, they typically comprise different announcements of the forthcoming maneuver. For example, at first, a general announcement such as "turn off to the right coming soon" at a rather long distance of 400-700 m may be output, followed by an advance announcement of the imminent maneuver including the distance to the maneuver, such as "turn off to the right after 100 meters", and, finally, in the immediate vicinity of the point of the maneuver, the instruction to perform the driving maneuver such as "now turn off to the right".

However, these different announcements output sequentially by the navigation system may be confusing for the driver, in particular if she/he is not familiar with the use of a navigation system. Furthermore, it happens that the indications given by speech output via the audio response unit are missed or misinterpreted by the driver. As a result, it occurs that the driver does not comply with the instructions output by the navigation system, what—in the worst case—may lead to a significant deviation between the position of the vehicle and the calculated route which should be followed by the driver, i.e., to wrong-way driving.

In such a case, if the vehicle leaves the calculated driving route and wrong-way driving, i.e., a predetermined significant positional deviation between the set position of the vehicle according to the predetermined driving route and the actual position of the vehicle, is determined by the navigation system by comparison of the actual position of the vehicle and the calculated driving route, a modified driving route is calculated by the navigation system. As an example, EP 0 833 291 B1 describes details relating to a method for "re-searching" the driving route when the vehicle is out of the calculated route. Such a method may include a search for an entire new route to the final destination from the current position of the vehicle, or, alternatively, the calculation of an additional route for returning to the original driving route calculated previously.

In both cases, the driver is provided with additional driving indications as to the additional maneuvers that have to be performed according to the newly calculated modified driving route. Nevertheless, in any case a modified driving route means a detour as compared to the original route what, of course, should be avoided.

SUMMARY OF THE INVENTION

An object of the invention is to overcome the above-mentioned problems and to provide a navigation system and a navigation method capable to provide improved driving indications which make it easier for the driver to follow the calculated route and which avoid that the driver ignores the driving indications.

The navigation system may comprise means for determining a driving route of the vehicle, means for determining a position of a vehicle, means for determining a driving manoeuvre in accordance with the determined route, means for outputting indications relating to the determined driving manoeuvre to a driver of the vehicle, and means for alerting the driver to potential wrong-way driving including means for detecting a potential wrong-way driving situation and means for outputting an indication relating to the potential wrong-way driving situation to the driver.

The invention also provides a navigation method for guiding a driver of a vehicle comprising the steps of determining a driving route of vehicle, determining a position of a vehicle, determining a driving manoeuvre in accordance with the determined driving route, outputting indications relating to the determined driving manoeuvre to the driver, and alerting the driver to potential wrong-way driving by the steps of detecting a potential wrong-way driving situation and outputting an indication as to the potential wrong-way driving situation to the driver, if a potential wrong-way driving has been detected.

BRIEF DESCRIPTION OF THE FIGURES

Further features and advantages of the navigation system and the navigation method become apparent from the following description of preferred embodiments with reference to the accompanying drawings in which.

DETAILED DESCRIPTION OF THE INVENTION

Figure 1:
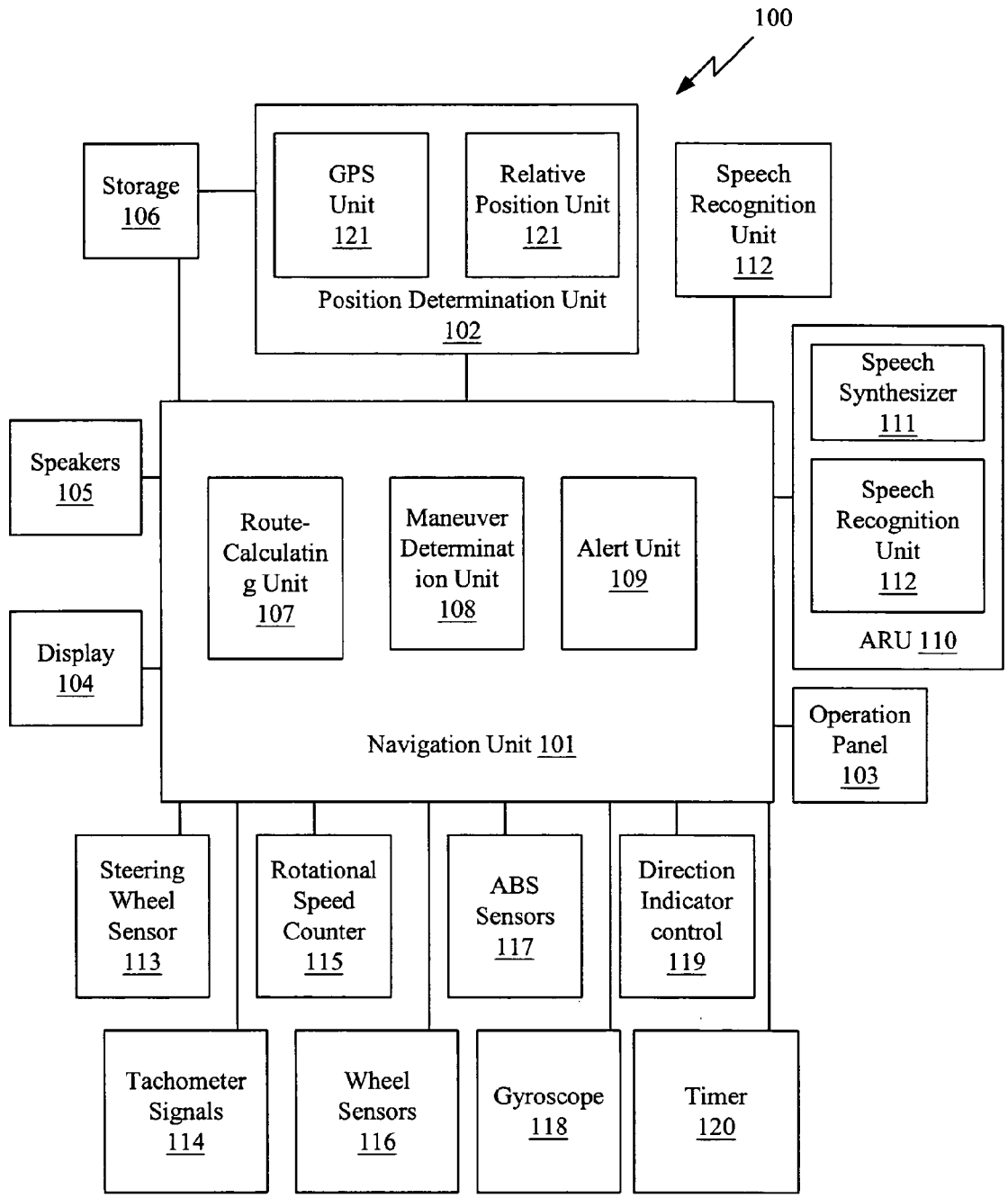
FIG. 1 is a schematic functional block diagram an implementation of a navigation system for altering the driver to potential wrong way driving.

In one approach, a potential wrong-way driving of the driver is detected by the navigation system and a respective indication is output to the driver as an alert message. "Potential" wrong-way driving in the sense of the invention has to be understood as a situation occurring prior to the above mentioned calculation of a modified driving route, i.e., a situation where the driver is still staying on the predetermined driving route. Accordingly, when the warning is output by the navigation system, the driver is still in the position to follow the originally determined driving route and to comply with the instructions output by the navigation system so that exclusively the driving maneuver(s) according to the originally calculated driving route have to be performed for reaching the final destination, i.e., without any additional turn off or turn back maneuvers which would be necessary according to a modified or a new driving route.

As a result of alerting the driver to potential wrong-way driving, the guidance of the driver by the navigation system according to the calculated route is significantly improved, because, after the driver has become aware of potential wrong-way driving, she/he may take steps for avoiding wrong-way driving in order to keep to the announced maneuvers according to the originally determined driving route, thereby staying on the calculated route.

Furthermore, since the driver is alerted early to potential wrong-way driving, namely already at a point of the route which is still comparatively far distant from the point of the route where the maneuver has to be performed, it is easier for the driver to initiate countermeasures and to correct her/his driving behavior as compared to later stages of the drive. This resides from the fact that the distance to the imminent maneuver is still comparatively large so that the time period available for initiating countermeasures and correcting the driving behavior is comparatively longer.

Moreover, in many cases the traffic situation near the spot or the location where the maneuver has to be performed is more difficult for complying with the driving instructions output by the navigation system as compared to earlier stages of drive. At the time of the announcement of a turning maneuver, for example, the driver might be standing in a lane where a line of cars are standing from which it might be difficult to get into another lane for performing the turning maneuver. In such a case, due to an indication of the risk of wrong-way driving such as a repetition of the forthcoming driving maneuver output by the navigation system well before the point of the road where the turning maneuver has to be performed, the driver's attention is heightened and focused on the forthcoming maneuver.

It is a further advantage to be capable to compensate for deficiencies of the database of map data used for navigation. For example, it occurs that the map data of the database does not reflect the precise point of the road where the driver should get into a certain lane in order to be prepared for a forthcoming turning maneuver, for example. In such a case it may occur that at the time of the announcement of the maneuver, the driver might already stand in a wrong lane from which it might be—not only difficult—but prohibited by traffic regulations to get into the correct line for performing the turning maneuver, similarly to the situation described above. Situations like that can be reliably prevented by the navigation system and the method according to the invention, whereby routing is significantly improved.

For determining the driving route, the navigation system according to the invention may comprise means for calculating the driving route in accordance with an information input by the driver, for example, a final destination. The information input by the driver may also relate to a route section or a point which shall be included or excluded in the resulting driving route, for example, for defining a driving route for transportation of dangerous media such as an ignitable liquid or gas, or a particular sightseeing route, city tour and the like. In particular in the case of transportation of dangerous media it is extremely important to ensure that the vehicle will not leave the predetermined driving route.

It goes without saying that the driving route may also be stored in the storage device of the navigation system or on a server to which the navigation system may have access by use of a communication device for selection of a driving route. Alternatively, the driving route may be defined completely by user input without any calculation by the navigation system. Preferably, the means for detecting a potential wrong-way driving comprises means for detecting at least one value of at least one parameter relating to an operation state of the vehicle, means for determining, in dependence on the predetermined driving route of the vehicle, at least one set value of parameters relating to an operation state of the vehicle, means for comparing the detected values of the parameters and the determined set values of the parameters and means for judging the result of the comparison for detecting a potential wrong-way driving situation on the basis of the result of the comparison.

The set values of parameters, which is/are determined by means for determining at least one set value of said parameter(s) relating to the operation state of the vehicle in dependence on the predetermined driving route of the vehicle, may be a value indicating potential wrong-way driving or a value indicating right-way driving.

In case where the set value defines right-way driving, "potential wrong way driving" has to be understood as a deviation of the actual values of parameters relating to the operation state of the vehicle and the determined set values of the parameters or the respective ranges thereof. A predetermined amount of deviation may be defined, for example 30%. Of course, the extent of deviation may strongly depend on the kind of the respective parameter and the respective traffic situation (speed limit etc.) where the maneuver has to be performed and may vary from one situation to another.

In case the set values defines) wrong-way driving, "potential wrong-way driving" in the sense of the invention occurs if the actual value of a parameter relating to the operation state of the vehicle reaches the determined set value.

The definition of a set value which indicates potential wrong-way driving or a value which indicates right-way driving aims in facilitating the processing of the large amount of data what is required for detection of potential wrong-way driving.

Preferably, the set values of the parameters are only determined in the vicinity (i.e., within a predetermined distance) of a location of the route where there is a possibility to leave the route by taking a wrong road which does not belong to the predetermined driving route. For this purpose, the means for alerting the driver to potential wrong-way driving contains means for determining a location of the route where it is possible to leave the route, such as junctions, crossings and the like, i.e., spots where wrong-way driving may occur.

Thereby, checking for potential wrong-way driving can be restricted to route sections where there is an actual risk for wrong-way driving, so that the amount of data processing necessary for potential-wrong-way driving can be significantly reduced.

A parameter relating to an operation state of the vehicle in the sense of the invention may be a position of a vehicle, a time period, an advancing direction of a vehicle, a position of a driving direction indicator control, an acceleration or a deceleration of a vehicle, a vehicle speed, a rotational speed of a vehicle and the like. The position of the vehicle may be a relative position such as a distance to a predetermined location of the route or an absolute position, i.e., a geographical position.

Actual values of the parameters relating to an operation state of the vehicle are detected by suitable sensors known in the art (such as speed, direction, temperature, turning, GPS location, tire pressure, etc. . . . ) that are connected to the navigation unit. The navigation unit typically will have a microprocessor, digital signal processor, or digital controller. The sensors may continuously detect the current values of the parameters relating to an operation state of the vehicle. For example, for determining an advancing direction of the vehicle a gyroscope or a steering wheel sensor may be applied and the position of the vehicle may be determined by a GPS-system, GSSN-system or the like. A relative position of the vehicle, such as a distance to a predetermined location of the route may be determined based on the absolute (geographical) position of the vehicle and map data stored in a storage device of the navigation system.

It has to be noticed that a positional deviation between the actual position of the vehicle and the set position of the vehicle according to the predetermined driving route does not necessarily indicate wrong-way driving but, in dependence on the amount of deviation, may still fall under the coverage of "potential" wrong-way driving. For example, the positional deviation that occurs if a driver gets into the left lane, for example, near to a point of the road where the driver should turn off to the right side may be detected as potential wrong-way driving. Preferably, staying on the predetermined driving route in the sense of the present invention may be defined as staying on the road (street) of the respective section of the originally predetermined driving route, including all driving lanes of the respective driving directions.

It should be understood that the respective parameters of the actual values and the parameters of the set values correspond to each other. The set values of the parameters may be time dependent, e.g. maintaining a vehicle speed (parameter) of lower than 50 km/h (value) for more than 30 seconds.

The set values of the parameters relating to the operation state may be derived from a combination of two or more of the above-mentioned parameters. Without listing all possible combinations, in dependence on the respective traffic situation, any of them may be utilized. Among that large variety, in particular a combination of the position of the vehicle and one or more parameters from the group vehicle speed, direction indicator control, advancing direction of the vehicle, and the time period during which these parameter are within at least one predetermined range of values is preferable for detection of potential wrong-way driving. More preferably, the set value of the parameter relating to an operation state of the vehicle may be a relative position of the vehicle which is defined by a distance to a location of the road where the driving maneuver has to be performed and, additionally, by a distance of the position of the vehicle to the predetermined driving route. Such a definition of set values (here: two distances) of the respective parameter (here: relative position) may be helpful to increase the accuracy of detection of potential wrong-way driving. The set values of the two distances may also be set in dependence on each other. For example, the distance to the predetermined driving route required for the detection of potential wrong-way driving may decrease with the decrease of the distance to the point of the road where the next turning off maneuver has to be performed.

Of course, the means for determining at least one set value of the parameters relating to the operation state of the vehicle and the means for detecting at least one actual value of these parameters may be adapted to these preferred configurations by comparing the respective determined parameters to the set values of the parameters, such as the above two distances and the actual values thereof during the operation of the moving vehicle, respectively.

The set values of the parameters are determined based upon the predetermined driving route. Since for following the predetermined driving route different operation states of the vehicle in terms of parameter values of velocity, advancing direction and the like are required at different locations of the route, the at least one set value of parameter(s) is determined in dependence on the circumstances at individual locations of the respective driving route or driving route section. More in detail, the set values may be determined in dependence on the kind of the driving manoeuvre, the traffic regulations along the respective route section and/or the course of the road along the driving route section. As a simple example for illustration, a turning off manoeuvre at a turning off angle of more than 90° requires a lower vehicle speed than a turning off angle of 30°.

By using, for example, the position of the direction indicator control as a parameter relating to the operation state of the vehicle for determining a potential wrong-way driving according to the invention, the occurrence of a positional deviation between the actual position of the vehicle and the predetermined driving route is not, necessarily required for detecting potential wrong-way driving. A relating example may be a predetermined route going straight ahead, on the one hand, and setting of the direction indicator control to a certain position, e.g., for turning left, by the driver and maintaining it in this position for longer than a predetermined time period without changing the driving direction. In such a case, the intention of the driver to turn off to the left is detected by the navigation system and a potential wrong-way driving is concluded, i.e. detected. A further example of the determination of a potential wrong-way driving may be an excessive vehicle speed determined at a position near the location of a turning off maneuver according to the predetermined route.

In other words, the navigation system according to the invention is capable to alert the driver to potential wrong-way driving while the vehicle is still staying on the predetermined driving route. In one approach, the means for outputting an indication relating to potential wrong-way driving to the driver comprises means for determination the content of indication output to the driver.

The means for determining the content of indication output to the driver may comprise means for determining output information relating to the correct driving route, i.e. the originally predetermined driving route. Thereby, the driver's attention is drawn to the risk of wrong-way driving, so that she/he can easily conclude what has to be done for staying on the correct route. For more complicated situations, where it is rather difficult for the driver to infer what to do, the means for determination the content of indication output to the driver may comprise means for determining driving recommendations for avoiding wrong-way driving. That is, in dependence on the situation of potential wrong-way driving, instructions may be output to the driver on how to stay on the predetermined driving route. Said driving recommendation to be output to the driver as determined by means for determining driving recommendations may include an indication relating to the parameter used for determining the potential wrong-way driving. For example, such an indication may relate to the vehicle speed or to the position of the driving direction indicator. The indication may also include information relating to the set value of the respective parameter. For example, the driver may be informed that the vehicle speed is too high for performing the following turn-off maneuver in accordance with the predetermined driving route. In other words, the indication to be output to the driver may include information relating to the deviation between the actually detected parameter relating to the operation state of the vehicle and the set value determined in accordance with the calculated driving route.

By outputting such a recommendation for avoiding wrong-way driving, the driver is assisted in following the predetermined driving route without paying attention to, for example, the display of the navigation system. Accordingly, the driver can rely completely on the output driving recommendations for following the route. The output means for outputting driving indications to the driver may comprise an audio-response unit in combination with loudspeakers and/or a display of the navigation system, such as a LCD display, Plasma Display, CRT display.

In FIG. 1, a navigation system 100 is shown. The navigation system in FIG. 1 has a navigation unit 101, a position determination unit 102 including a GPS-unit 121 and a unit 122 for determining a relative position of a vehicle, an operation panel 103, a display 104, a set of speakers 105 and a storage device 106. An audio-response unit (ARU) 110 including a text-to-speech (TTS) synthesizer 111 and a speech recognition unit 112 for voice command purposes are connected to the navigation unit 101. The input/output equipment of the navigation system 100 according to the present embodiment is constituted of the operation panel 103, the display 104, the audio-response unit (ARU) 110 including the text-to-speech (TTS) synthesizer 111 and the speech recognition unit 112. However, the configuration of the input/output equipment is not limited thereto and any kind of human machine interface known in the art for transferring data between user and system may be provided in dependence on the demands of the individual user. For example, the display 104 may be constituted of a touch screen and the operation panel 103 may comprise a joystick and/or a microphone not shown in FIG. 1. The navigation unit 101 comprises a driving route-calculating unit 107, a driving maneuver determination unit 108, and an alert unit 109 that is described in more detail below with reference to FIG. 2.

The storage device 106 is a mass storage medium for storing map data constituted of a CD-ROM and a CD-ROM drive, for example, and is connected to the navigation unit 101 and the position determination unit 102. The navigation system 100 according to the invention further comprises as a plurality of sensors including a steering wheel sensor 113, a rotational speed counter 115, wheel sensors 116, ABS sensors 117, a gyroscope 118, and a sensor 119 for determining the position of the driving direction indicator control as well as a timer 120 which are connected to the navigation unit 101. A unit 114 for providing a tachometer signal is also connected to the navigation unit 101.

Figure 2:
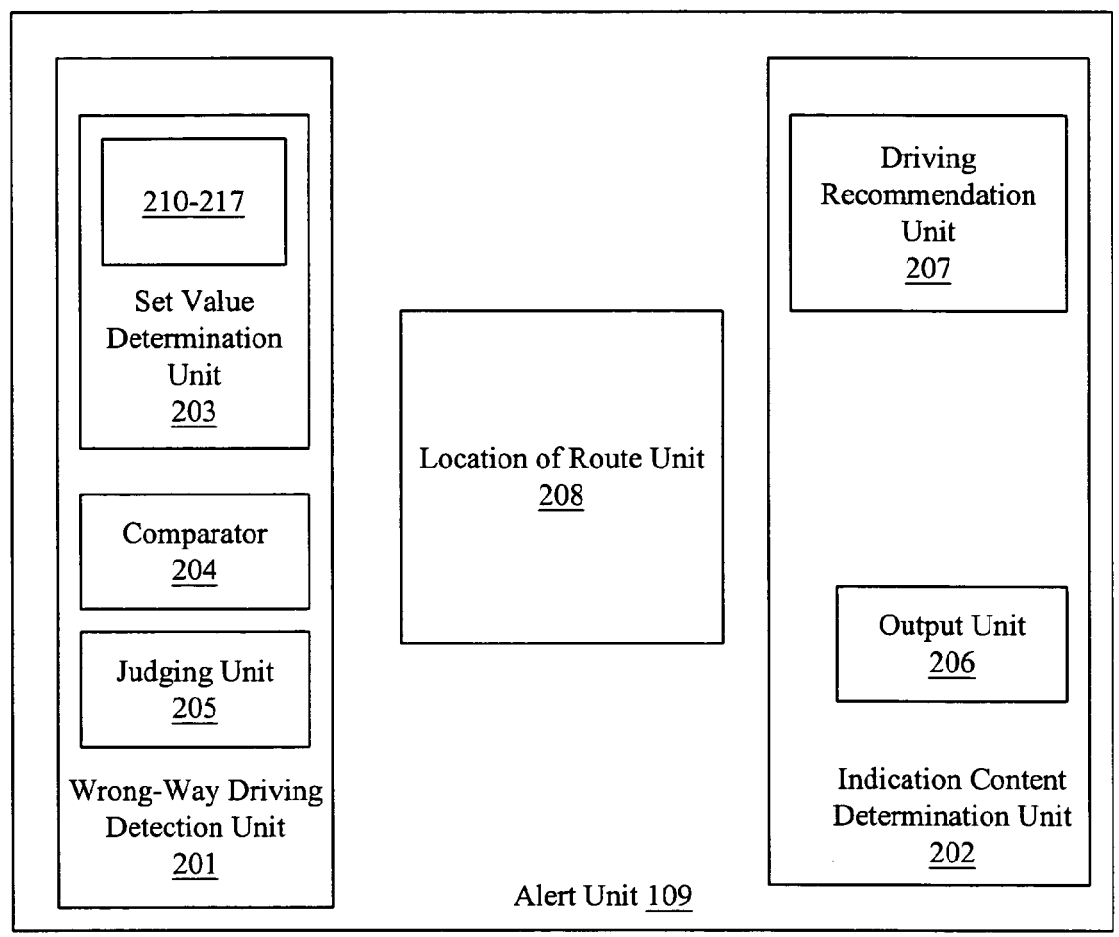
FIG. 2 is a schematic functional block diagram of the alert unit of the navigation system shown in FIG. 1.

The alert unit 109 of the navigation unit 101 of the navigation system 100 shown in FIG. 1 is illustrated in more detail in FIG. 2. The alert unit 109 comprises a potential wrong-way driving detection unit 201, an indication content determination unit 202 and a unit 208 for determining a location of the route where it is possible to leave the route. The unit 208, determines locations of the route where it is possible to leave the route on the basis of the calculated driving route as determined by the driving route calculation unit 107 and the map data provided by the storage device 106.

The potential wrong-way driving detection unit 201 includes a set value determination unit 203 for the determination of set value(s) of a parameter(s) relating to the operation state of the vehicle. The set value determination unit 203 comprises a plurality of subunits for determining at least one set value of at least one parameter or a combination thereof from the group: geographical position of a vehicle (unit 210), relative position of a vehicle (unit 211), advancing direction of a vehicle (unit 212), position of a driving direction indicator control (unit 213), acceleration/deceleration of a vehicle (unit 214), vehicle speed (unit 215), rotational speed of a vehicle (unit 216) and a time period during which at least one value of said parameter(s) is within a predetermined value range (unit 217), which—for the sake of simplicity—are illustrated in FIG. 2 as an unitary component with reference numerals 210-217.

The potential wrong-way driving detection unit 201 may have a comparator 204 for comparing the set value(s) determined by the set value determination unit 203 and the actual values determined or detected by the position determination unit 102 including units 121 and 122 and/or the sensors 113-120 including unit 114. A judging unit 205, such as a program executed by a controller, microprocessor, or digital signal processor is provided for judging the result of the comparison performed by the comparator 204.

The indication content determination unit 202 may have a unit 206 for determining output information relating to the correct driving route and a unit 207 for determining driving recommendations for staying on the correct driving route (i.e., the originally calculated driving route) in dependence on the detected potential wrong-way driving situation.

Figure 3:
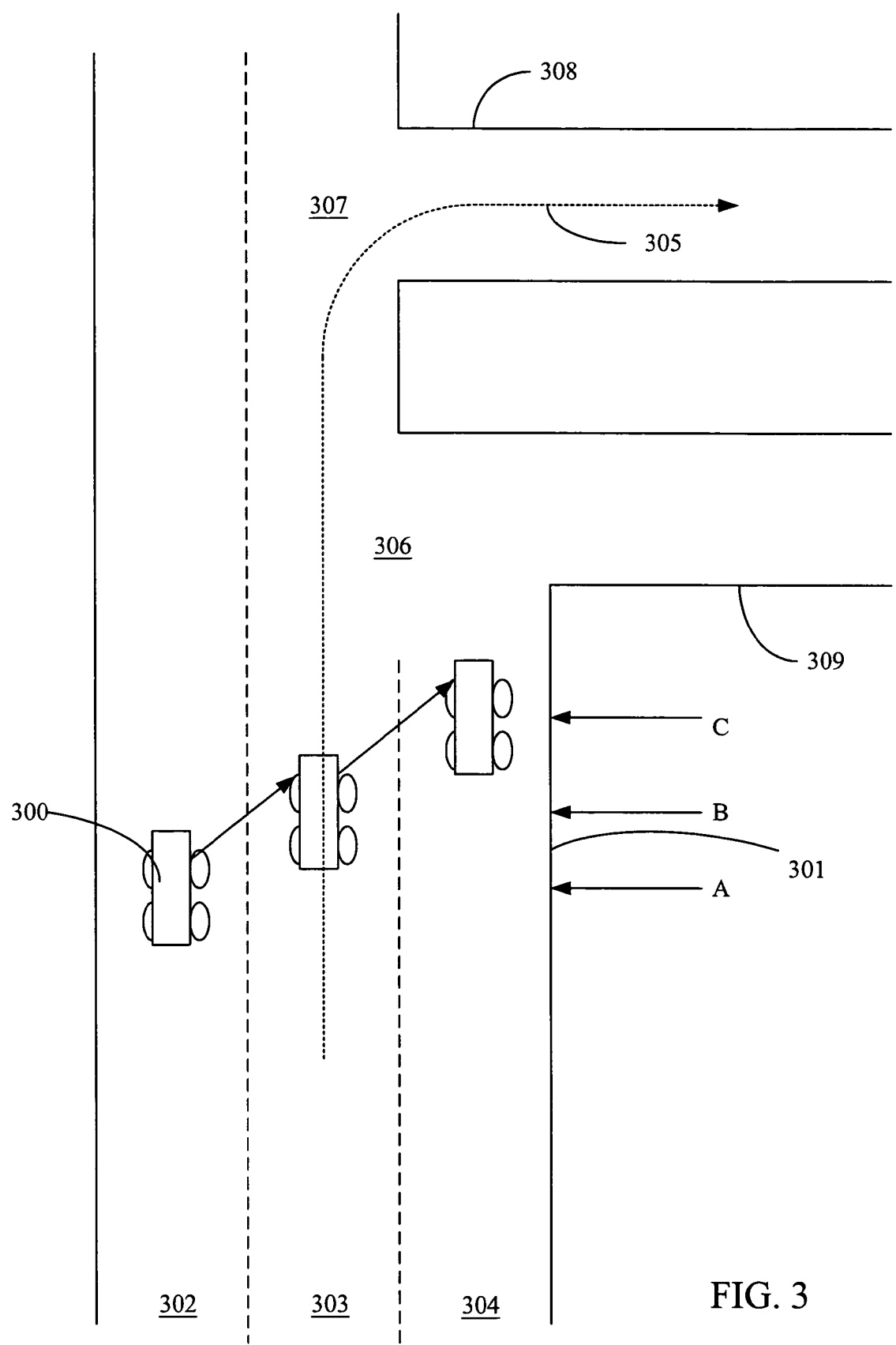
FIG. 3 is a schematic illustration of a situation of potential wrong-way driving.

A situation of potential wrong-way driving is illustrated schematically in FIG. 3. A vehicle 300 is moving along a three-lane road 301 comprising lanes 302-304. More specifically, the vehicle 300 is moving along traffic lane 302 at point "A" of road 301 when the navigation system 100 of the vehicle 300 outputs an advance announcement of a maneuver "right-hand turn after 400 meters" in accordance with the calculated driving route 305 indicated as a dotted line in FIG. 3. The driver who heard the advance announcement notices the crossing 306 lying ahead and misinterprets the advance announcement output by the navigation system as to be related to crossing 306 instead of crossing 307. As a result, the driver operates the lever of the driving indicator control for moving to the right, reduces the vehicle speed, and switches from lane 302 to lane 304 at point "C" of the road 301.

Accordingly, since in the present situation the driver misunderstood the advance announcement output by the navigation system at point "C" of road 301, there is a risk that the driver turns off to the right side at crossing 306 instead of crossing 307 according to the calculated driving route 305. In other words, at point "C" of road 301 a situation of potential wrong-way driving in the sense of the invention occurs.

Such a situation of potential wrong-way driving can be recognized and wrong-way driving can be avoided by the use of a navigation system, for example.

Figure 4:
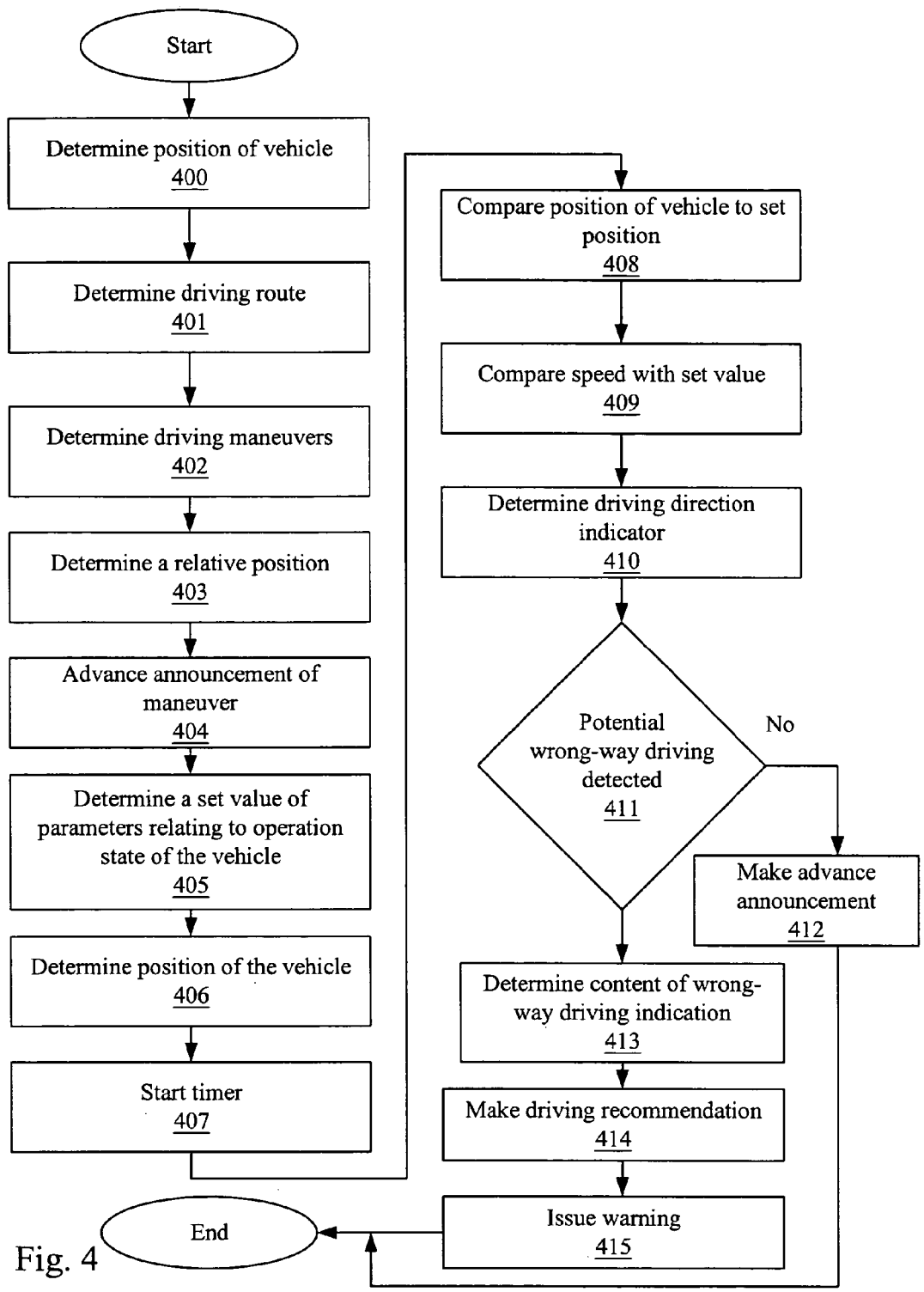
FIG. 4 shows a flow chart of an embodiment of a navigation method according to the invention for alerting the driver to potential wrong-way driving in the situation illustrated in FIG. 3.

In the following an implementation of a navigation method according to the invention for guiding a driver of vehicle 300, if a potential wrong-way driving situation as shown in FIG. 3 happens, is described with reference to FIG. 4.

In step 400, after starting the engine of the vehicle, the position of the vehicle is determined by the position determination unit 102 of the navigation system 100. In the following the determination of the geographical position is continued periodically during the drive by the position determination unit 102. In step 401, after an input of a desired destination by the driver via the operation panel 103, a driving route to the final destination is calculated by the driving route calculation unit 107. The resulting driving route from the starting point to the final destination as input by the driver includes a route section constituted of sections of roads 301 and 308 shown in FIG. 3. While in the present implementation the driving route has been predetermined by calculation in accordance with an input information (final destination), the driving route may also be predetermined by selection and download from an external server via the internet, for example.

For following the calculated route, a plurality of driving maneuvers is determined in step 402 by the driving maneuver determination unit 108. Among these maneuvers, there is a right-hand turn off maneuver at crossing 307 in order to reach road 308 coming from road 301 as shown in FIG. 3.

During the drive the distance to crossing 307 where the turning off maneuver to the right has to be performed is continuously determined in step 403 by the unit 122 for determining a relative position of the vehicle by comparing the actual position of the vehicle 306 as determined by the GPS system 121 and the location of crossing 307 based on map data of the storage device 106.

In step 404, when reaching a predetermined distance to the location of the maneuver such as 200 m to crossing 37, the advance announcement "turn off to the right after 200 meters" is output to the driver by the audio response unit 110 via loudspeakers 105. Furthermore, in step 405 a set value of parameters relating the operation state of the vehicle is determined by the set value determination unit 203. In the present case, the set value of the parameters represents a value that indicates potential wrong-way driving and is constituted of a combination of the parameters position of the vehicle, vehicle speed, position of the driving direction indicator control and time. The specific values of these parameters are set as follows:

Condition A: a distance of the vehicle to crossing 306 of less than 300 meters, Condition B: a vehicle speed lower than 40 km/h for more than 5 seconds Condition C: a downward position of the driving direction indicator control maintained for more than 5 seconds.

In the present embodiment, since the position of the vehicle 300 is continuously determined by the position determination unit 102 of the navigation system 100, in the following merely the position of the driving direction indicator control is determined by sensor 119 in step 406. If the driving direction indicator control is set to a downward position indicating the willingness of the driver to perform a turn off maneuver to the right, in step 407 the timer 120 is started and the time period of the driving direction indicator control being set to the downward position is monitored.

As mentioned above, the set value of parameters for defining a potential wrong-way driving in the present embodiment is defined by the combination of the conditions A+B+C. Accordingly, in step 408 the actual position of the vehicle as determined in step 400 by the position determination unit 102 of the navigation system 1 is compared with the set position according to condition A; in step 409 the speed of the vehicle obtained from the tachometer signal unit 114 is compared with the set value as specified by condition B and in step 410 the position of the driving direction indicator control as determined by sensor 119 in step 406 is compared with the set value as specified by condition C by means of the comparator 204.

If no potential wrong-way driving is detected in step 411 by the judging unit 205, in step 412 an advance announcement as to the approaching crossing 307 is output when the vehicle which is following the calculated driving route reaches a predetermined distance to the point of the route where the maneuver has to be performed, i.e., the crossing 307, what is determined by the relative position detection unit 122. If, in step 411, a potential wrong-way driving is detected, in step 413 the content of indication relating to potential wrong-way driving is determined by the indication content determination unit 202. That is, according to the example of the present embodiment, the current distance to the driving maneuver (here: 200 m) and the kind of driving maneuver (here: turn off to the right) are determined as the information to be output to the driver by the unit 206 for determining output information relating to the correct driving route. Furthermore, in step 414 a driving recommendation for avoiding wrong-way driving is determined by the unit 207 for determining driving recommendations for staying on the correct driving route. In the exemplary situation of the present embodiment, from the location of crossing 307, the position of the vehicle and the course of the road between the location of the crossing 307 and the position of the vehicle 300 at point C of road 301, as illustrated in FIG. 3, based on the map data stored in the storage device 106, it is determined that going straight ahead is the appropriate driving behavior for reaching crossing 307 from the current position of the vehicle 300 at point C.

Accordingly, the following warning is output in step 415 to the driver: "Attention; possibly wrong-way driving; Keep going straight ahead; turn off to the right after 200 m".

Further embodiments relating to methods according to the invention are described in the following. The embodiments 2 to 5 are based on the above first embodiment described with reference to FIGS. 3 and 4 but comprising the following modifications:

According to a second embodiment, instead of the detection of potential wrong-way driving in dependence on the combination of set values according to the above conditions A+B+C, wrong-way driving may also be detected by a combination of set values A+B or A+C.

According to a third implementation, instead of calculating a set value being an indicative value of said parameter relating to an operating state of the vehicle for leaving route, a value of said parameter relating to an operating state of the vehicle which indicates that the vehicle is staying on the route is calculated as a set value. Specifically, instead of condition "B" a speed range of Vset>40 km/h is determined as a set value (condition D) based on the speed limit of 70 km/h on road 301. If the vehicle speed falls below 40 km/h, potential wrong-way driving is concluded since the reduction of speed is interpreted as an indication that the driver intends to turn off at crossing 306.

As becomes apparent from the above implementation, the determination of set values strongly depends on the traffic regulations at the respective road sections or locations. For example, according to a fourth embodiment, if a traffic signal is installed at the crossing 306 the above conditions "A" and "D" are not sufficient because it has to be expected that the vehicle has to stop at the traffic light what according to the conditions A+D or A+C would lead to a detection of wrong-way driving, erroneously. In order to distinguish between waiting at the traffic light and potential wrong-way driving, in such a case a combination of conditions A+B+C is necessarily required.

A further important factor for the determination of the set value is the driving route and the circumstances at the point of the road where the manoeuvre has to be performed. For example, according to a fifth implementation, potential wrong-way driving is to be detected in the area of crossing 307 where the driver has to get on route 308 for following the calculated driving route, as shown in FIG. 3.

Accordingly, the set values of parameters indicating potential wrong-way driving may be defined as follows:

Condition E: a distance of the vehicle to crossing 307 of less than 150 meters, Condition F: a vehicle speed higher than 70 km/h That is, if the vehicle exceeds a speed limit of 70 Km/h within a comparatively small distance of 150 meters to crossing 307 this is interpreted as an indication that the driver will not turn off to the right at crossing 37 but intends to drive straight on along road 301 what would lead to wrong way driving.

It goes without saying that the implementations 1-5 as described above may be combined in any manner suitable to put the invention into practice, according to the knowledge of a person skilled in the art in dependence on the particular demands of the respective application.

What is claimed is:

1. A navigation method for guiding a driver of a vehicle comprising:
    predetermining a driving route of the vehicle;
    determining, by a position determination unit, a position of the vehicle;
    determining, by a maneuver determination unit, a driving maneuver in accordance with the predetermined driving route;
    detecting, by a wrong-way driving detection unit, a potential wrong way driving situation away from the predetermined driving route, while the vehicle is on the predetermined driving route, and based in part on a current speed of the vehicle; and
    alerting, by an alert unit, the driver to the potential wrong way driving, while the vehicle is on the predetermined driving route, by outputting to the driver an indication pertaining to said potential wrong way driving situation, in response to the potential wrong way situation being detected.

2. The navigation method according to claim 1, further comprising:
    detecting said potential wrong way driving situation based on a value of a parameter relating to an operation state of the vehicle;
    determining the value of the parameter relating to the operation state of the vehicle based upon the predetermined driving route;
    comparing the detected value and the determined value; and
    judging the result of comparison to detect said potential wrong way driving situation.

3. The navigation method of claim 2, wherein the determined value is based upon traffic provisions along the predetermined driving route.

4. The navigation method of claim 2, wherein the determined value is based upon the determined driving maneuver.

5. The navigation method of claim 2, further comprising:
    determining a location of the predetermined driving route where it is possible to leave the predetermined driving route.

6. The navigation method of claim 2, wherein the determining the value further comprises
    determining the at least one value within a predetermined distance to a point of the predetermined driving route where the driving maneuver is to be performed.

7. The navigation method of claim 2, where the parameter comprises at least one of a geographical position of the vehicle, a relative position of the vehicle with respect to at least one location of the predetermined driving route, an advancing direction of the vehicle, a position of a direction indicator control, a vehicle speed, a rotational speed of the vehicle, and a time period during which any parameters are within one or more predetermined ranges of values.

8. The navigation method of claim 7, wherein a value of a respective parameter is selected based upon another value of another parameter and a distance to a point in the predetermined driving route where the determined driving maneuver is to be performed.

9. The navigation method of claim 2, further comprising:
    determining an output information related to said predetermined driving route which is to be output to the driver upon detection of the potential wrong way driving situation.

10. The navigation method according to claim 2, further comprising:
    inputting information relating to a desired driving route; and
    calculating the predetermined driving route in accordance with said input information.

11. The navigation method according to claim 2, further comprising:
    selecting a driving route from driving routes stored in a storage medium of an external server.

12. A navigation method for guiding a driver of a vehicle comprising:
    predetermining a driving route of the vehicle;
    determining, by a position determination unit, a position of the vehicle;
    determining, by a maneuver determination unit, a driving maneuver in accordance with the predetermined driving route;
    alerting, by an alert unit, the driver to potential wrong way driving by detection of a potential wrong way driving situation, the potential wrong way driving situation deviating away from the predetermined driving route being detected while on the predetermined driving route and based in part on a current speed of the vehicle; and
    outputting, by an output unit, an indication relating to said potential wrong way driving situation to the driver, in response to a potential wrong way situation being detected.

13. The navigation method according to claim 12, further comprising:
    detecting said potential wrong way driving situation based on a value of a parameter relating to an operation state of the vehicle;
    determining the value of the parameter relating to the operation state of the vehicle based upon the predetermined driving route;
    comparing the detected value and the determined value; and
    judging the result of comparison to detect said potential wrong way driving situation.

14. The navigation method of claim 13, wherein the determined value is based upon traffic provisions along the predetermined driving route.

15. The navigation method of claim 13, wherein the determined value is based upon the determined driving maneuver.

16. The navigation method of claim 13, further comprising:
    determining a location of the predetermined driving route where it is possible to leave the predetermined driving route.

17. The navigation method of claim 13, wherein the determining the value further comprises
    determining the at least one value within a predetermined distance to a point of the predetermined driving route where the driving maneuver is to be performed.

18. The navigation method of claim 13, where the parameter comprises at least one of a geographical position of the vehicle, a relative position of the vehicle with respect to at least one location of the predetermined driving route, an advancing direction of the vehicle, a position of a direction indicator control, a vehicle speed, a rotational speed of the vehicle, and a time period during which any parameters are within one or more predetermined ranges of values.

19. The navigation method of claim 13, further comprising:
    determining an output information related to said predetermined driving route which is to be output to the driver upon detection of the potential wrong way driving situation.

20. The navigation method according to claim 13, further comprising:
    inputting information relating to a desired driving route; and
    calculating the predetermined driving route in accordance with said input information.

* * * * *